April 27, 1926.

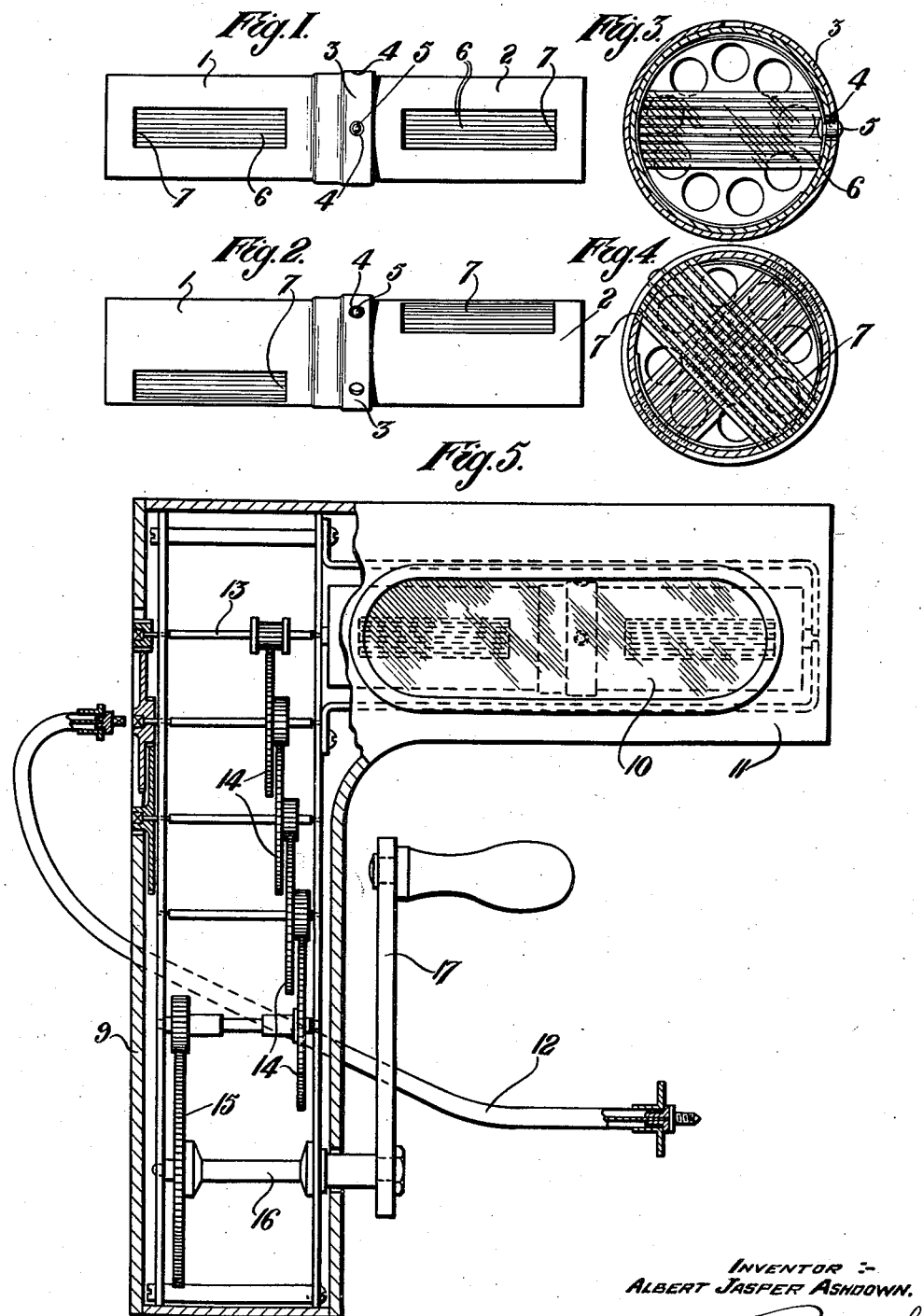

A. J. ASHDOWN 1,582,622

STROBOSCOPIC APPARATUS

Filed Dec. 8, 1924    2 Sheets-Sheet 2

INVENTOR:-
ALBERT JASPER ASHDOWN.
PER:- Rayner &
ATTORNEYS.

Patented Apr. 27, 1926.

1,582,622

UNITED STATES PATENT OFFICE.

ALBERT JASPER ASHDOWN, OF LETCHWORTH, HERTFORDSHIRE, ENGLAND.

STROBOSCOPIC APPARATUS.

Application filed December 8, 1924. Serial No. 754,610.

*To all whom it may concern:*

Be it known that I, ALBERT JASPER ASHDOWN, a subject of the King of Great Britain and Ireland, residing at 21 Norton Road, Letchworth, Hertfordshire, England, have invented a new and useful Stroboscopic Apparatus, of which the following is a specification.

My invention relates to improvements in stroboscopic apparatus which may be used for the purpose of studying objects in motion and having regular or periodic movements either rectilinear, rotary or vibratory.

Heretofore, it has been essential to employ cumbrous discs rotating at very high peripheral speeds and having to be compounded i. e. two discs working in opposite directions, an arrangement extremely heavy, having limited aperture and field of vision and requiring relatively high power to drive it. Alternatively an apparatus essentially designed for illuminating the object being inspected in darkened surroundings by means of a rapid intermittent illumination operated by a complicated gear system and make-and-break device. A further disadvantage of known systems is that the apparatus has to be affixed to the object being examined, and is therefore not easily transportable. The object of this invention is to obviate these disadvantages by providing a stroboscopic apparatus which will be mechanically simple and portable and which can rely upon daylight somewhat amplified, if needs be, by a continuous beam of light.

A further object of this invention is to enable the operator to adjust the apparatus so that the speed of alternations of vision of the objective can be varied.

According to this invention stroboscopic apparatus is characterized by the provision of shutter means adapted to be interposed between the observer and the objective, such shutter means being apertured and operable in such manner that the object being observed is periodically totally obscured from the observer by a movement of the shutter means relatively much smaller than any distance across the full aperture of the shutter, such shutter means being divided into more than one part through which the objective may be observed, such parts being capable of relative adjustment so that they can be brought successively into position for observing the objective.

In order that my invention may be clearly understood and readily carried into effect reference is made to the accompanying drawings in which:—

Fig. 1 is a front elevation of the shutter with its two parts arranged for synchronous operation.

Fig. 2 is a front view of the same shutter with its two parts arranged for successive operation.

Fig. 3 is an enlarged sectional end view of Fig. 1, and

Fig. 4 is an enlarged sectional end view of Fig. 2.

Fig. 5 is a front view partly in section illustrating a stroboscopic apparatus according to my invention, operable by hand or alternately from any outside source of movement through a flexible drive.

Figure 6:
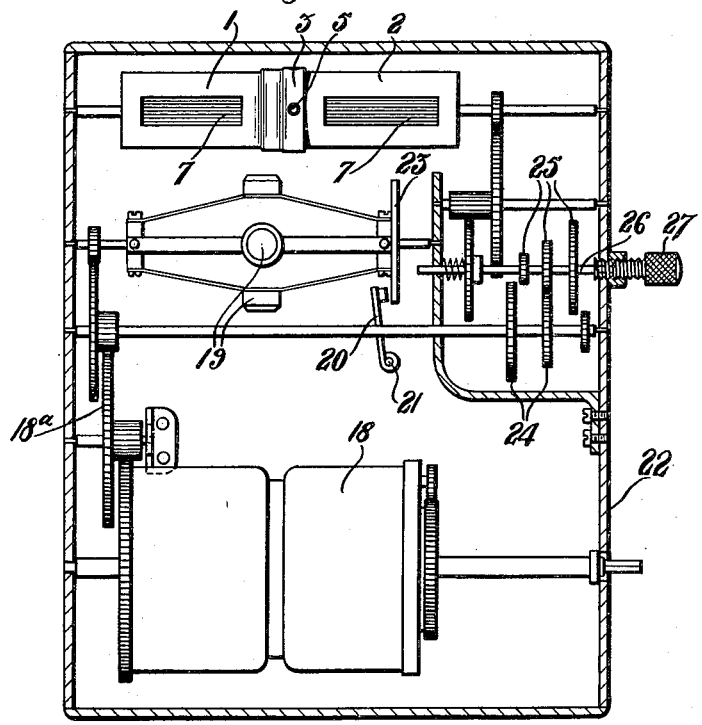
Fig. 6 is a sectional view showing the interior of a stroboscopic apparatus according to my invention operable by a clockwork motor.

Referring to the drawings, the shutter comprises two cylindrical or sleeve like members 1 and 2 engaged end on end in axial alignment and connected to each other by enlarging the end as at 3 of one of the members to accommodate one end of the other member, the latter member having two or more indentations or holes 4 in its circumference to receive a locking spring clip in the form of a small plunger 5 carried by the enlarged end of the other member. By this means the two members 1 and 2 can be rotated relatively axially for the purpose of bringing the two sets of slats 6 into parallel or angular relationship.

The slats 6 are fixed in linear slots or grooves in the inner surfaces of the members 1 and 2, and each of the latter members has a pair of diametrically opposed windows or openings 7 so located that an observer can see through the spaces between the slats when they are parallel with and exactly opposite to the line of sight.

It is preferred to have the members 1 and 2 so adjustable by rotation upon their common axis that the slats 6 are either in the same plane or at right angles to each other, but if desired other angles can be arranged for it being apparent that this is obtained by the disposition of the indentations or holes 4. When the two members are adapted for adjustment in more than two relative positions degree indications can be marked on one member and an index mark to register with them on the other member.

A convenient form of hand operated apparatus according to my invention is illustrated by Fig. 5 wherein the mechanism is contained within an L-shaped casing 9 having a window or aperture 10 in a horizontal portion 11 adapted to accommodate the shutter. The shutter carries an axial spindle 13 which is adapted to be driven by a high speed train 14, having a prime mover 15 secured to a spindle 16 to which is connected a crank 17. Alternatively, spindle 13 is driven mechanically by reducing gears through flexible shaft 12 attached to any suitable outside source of motion.

In Fig. 6 is shown the interior of an apparatus in which the shutter is rotated by a clockwork motor 18. The transmission system in this embodiment includes a governor 19 geared by a high speed train 18ª to the motor 18. A brake arm 20 is pivoted at 21 to the casing 22 and is adapted to be engaged by the discs 23 of the governor 19 in known manner to prevent excessive speeds, or can be moved into engagement with such disc to vary the speed within the required limits. In order to further provide for variable range of speeds a change speed gear is provided consisting of driving elements 24 and driven elements 25, the latter being carried by a spindle 26 movable axially by the rotation of a thumb screw 27 threaded into the casing and accommodating one end of the spindle 26.

Figure 7:
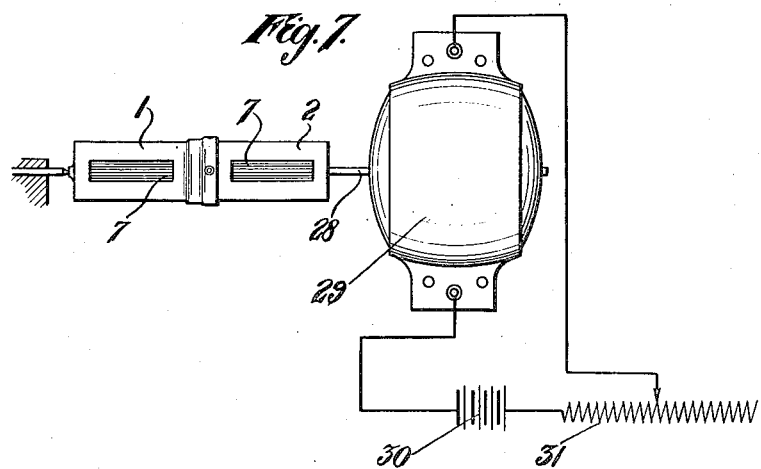
Fig. 7 is a diagrammatic view illustrating a method of electrically operating my invention.

In Fig. 7 is diagrammatically illustrated a system of electrically driving the shutter. In this embodiment the spindle 28 of the shutter is rotated by a motor 29 which receives current from a source 30, and the speed is varied as desired by means of a variable resistance 31 included in the circuit.

When both sets of slats are parallel if very high definition is required, such as will enable the observer to get a close analysis of the workings of small and intricate machine parts, the plates would be placed so close together that the light is thereby deleteriously affected. This in itself is not serious as additional light can always be obtained by artificial means. This, however, renders the particular instrument unsuitable for general workshop conditions, particularly in the timing of shafts, wheels, cam movements and the like. On the other hand, if the plates are spaced a suitable distance apart for this general effect, then the apparatus becomes inapplicable for the analyzing of the beforementioned parts in motion. It was thought, at one time to obtain the double purpose by means of a shutter having the plates on one side more widely spaced. This would have the effect of giving an average compounding, and to obtain high definition one eye would be closed and the other would take the view through the more highly compounded side. By manipulating the improved shutter of the present application so that one set of slats is moved round in its socket to a point where it engages in a new position by the spring clip 5, one of the set of slats is brought into a position at right angles or other desired angle to the other. This gives the same effect as though the plates were placed double the distance apart; in other words, the low compounding effect necessary for general application. The advantage in this is that the intervals of observation can be more highly compounded than would be found advisable with the ordinary construction, seeing that the shutter need only be brought into a condition for extremely high definition under special circumstances.

Another important advantage in the use of this duplex shutter is that it doubles the speed capacity of the machine, or conversely that a machine to give the same effect would need to have only one half the strength of driving mechanism than hitherto, with a considerable saving in the manufacture and weight.

By means of this improved construction a stroboscope can be made of portable size dealing with speeds up to 50,000 R. P. M. A minor advantage is that by varying the two compoundings incorporated in one shutter a wide range of variations in definition can be secured.

I claim:—

1. In a stroboscopic apparatus having shutter means adapted to be interposed between the observer and the objective, the shutter means comprising a plurality of spaced strips adapted to be simultaneously brought into a position in superimposed planes parallel with and in the path of the line of sight to the objective, means for effecting movement of such shutter means, the spaced strips being divided into two relatively movable sets whereby they can be adjusted to different planes.

2. Stroboscopic apparatus comprising a shutter having two sets of parallel spaced strips, the sets being capable of relative adjustment so that they can be located in a common plane or in different planes, whereby the sets can be adjusted in one position so that the observer sees the objective through both simultaneously, or alternately in succession.

3. Stroboscopic apparatus comprising an apertured shutter operable in such manner that the object being observed is periodically totally obscured from the observer by a movement of the shutter means relatively much smaller than any distance across the full aperture of the shutter, such shutter being divided into more than one part through which the objective may be observed, such parts being capable of relative adjustment so that they can be brought successively into position for observing the objective, said shutter being operated by hand rotation or mechanically from a machine being observed or other outside source of movement, or from a clockwork or electric motor, means being provided to vary the speed of rotation of said shutter means.

ALBERT JASPER ASHDOWN.